(12) United States Patent
Mishiro et al.

(10) Patent No.: US 9,249,025 B2
(45) Date of Patent: *Feb. 2, 2016

(54) METHOD FOR PRODUCING CARBONACEOUS FILM AND METHOD FOR PRODUCING GRAPHITE FILM

(75) Inventors: Makoto Mishiro, Settsu (JP); Yusuke Ohta, Settsu (JP); Takashi Inada, Settsu (JP); Yasushi Nishikawa, Settsu (JP)

(73) Assignee: KANEKA CORPORATION, Osaka-Shi (JP)

( * ) Notice: Subject to any disclaimer, the term of this patent is extended or adjusted under 35 U.S.C. 154(b) by 30 days.

This patent is subject to a terminal disclaimer.

(21) Appl. No.: 14/343,639

(22) PCT Filed: Jul. 25, 2012

(86) PCT No.: PCT/JP2012/004730
§ 371 (c)(1),
(2), (4) Date: Jul. 3, 2014

(87) PCT Pub. No.: WO2013/035237
PCT Pub. Date: Mar. 14, 2013

(65) Prior Publication Data
US 2014/0328745 A1    Nov. 6, 2014

(30) Foreign Application Priority Data

Sep. 8, 2011  (JP) ................................. 2011-195942

(51) Int. Cl.
*C01B 31/02* (2006.01)
*C01B 31/04* (2006.01)

(52) U.S. Cl.
CPC ................. *C01B 31/04* (2013.01); *C01B 31/02* (2013.01); *C01B 2204/22* (2013.01); *C01B 2204/24* (2013.01)

(58) Field of Classification Search
CPC .............................. C01B 31/02; C01B 31/04
See application file for complete search history.

(56) References Cited

U.S. PATENT DOCUMENTS 3,917,884 A * 11/1975 Jahn .............................. 427/228
8,992,876 B2 * 3/2015 Mishiro et al. ............ 423/445 R

FOREIGN PATENT DOCUMENTS

| JP | 63-256508 A | 10/1988 |
| JP | 8-143307 A | 6/1996 |
| JP | 2006-327907 A | 12/2006 |
| JP | 2008-207967 A | 9/2008 |
| JP | 2010-64929 A | 3/2010 |

OTHER PUBLICATIONS

International Search Report, issued in PCT/JP2012/004730, dated Oct. 30, 2012.

\* cited by examiner

*Primary Examiner* — Stuart Hendrickson
(74) *Attorney, Agent, or Firm* — Birch, Stewart, Kolasch & Birch, LLP

(57) ABSTRACT

Disclosed herein is a method for producing a roll-shaped carbonaceous film by polymer pyrolyzis while suppressing the occurrence of fusion bonding in the roll-shaped carbonaceous film. The carbonaceous film production method includes the step of heat-treating a polymer film wound into a roll, wherein, at a temperature equal to or higher than the pyrolyzis onset temperature of the polymer film but equal to or lower than a temperature at which the weight of the polymer film is reduced by 40% as compared to that before heat treatment, the roll-shaped polymer film has (2-1) a gap between layers of the polymer film so that a value determined for the whole roll-shaped polymer film by dividing the thickness of the gap between adjacent layers of the polymer film (Ts) by the thickness of the polymer film (Tf) (Ts/Tf) satisfies a relationship of $0.33 \leq Ts/Tf \leq 1.50$ and/or (2-2) a space inside a 50% cross-sectional circle of the roll-shaped polymer film so that the area of the space inside the 50% cross-sectional circle is 25% or more of the cross-sectional area of the 50% cross-sectional circle.

4 Claims, 10 Drawing Sheets

200

210

METHOD FOR PRODUCING CARBONACEOUS FILM AND METHOD FOR PRODUCING GRAPHITE FILM

TECHNICAL FIELD

The present invention relates to a method for producing a long (roll-shaped) carbonaceous film by polymer pyrolysis. More specifically, the present invention relates to a method for producing a long carbonaceous film as an intermediate step in producing a graphite film.

BACKGROUND ART

A graphite film is a material having excellent characteristics such as high heat conductivity, and is therefore widely used in electronic parts and the like. A commonly-available high heat-conductive graphite film is produced by, for example, an expansion method in which expanded graphite is rolled into a sheet or a polymer pyrolysis method.

For example, a graphite film production method has been disclosed, in which a POD film having a width of 180 mm and a thickness of 50 μm is wound as a polymer film three turns around a graphitic carbon cylinder having an outer diameter of 68 mm, an inner diameter of 64 mm, and a length of 200 mm, and is then heated in an inert gas or vacuum at 1800° C. or higher to obtain a long graphite film (Patent Document 1).

Patent Document 1: JP-A-63-256508

DISCLOSURE OF THE INVENTION

Problems to be Solved by the Invention

However, in the case of the method disclosed in Patent Document 1, when the number of windings is increased, a produced decomposition gas is less likely to be discharged from between film layers. Therefore, the decomposition gas is fixed between the film layers and acts like an adhesive when cooled so that fusion bonding occurs in a resulting roll-shaped carbonaceous film.

It is therefore an object of the present invention to produce a long carbonaceous film while suppressing the occurrence of fusion bonding.

The reason why fusion bonding occurs in a roll-shaped carbonaceous film is that a decomposition gas produced during carbonization/decomposition stays between film layers, and is then fixed and acts like an adhesive when cooled. The size of a resulting carbonaceous film is about 80% of that of a polymer film as a raw material due to shrinkage during carbonization/decomposition. When a polymer film is wound into a roll, film layers press against one another due to such shrinkage during carbonization/decomposition, and therefore a decomposition gas produced during carbonization/decomposition cannot be discharged from between the film layers so that fusion bonding occurs.

Means for Solving the Problems

The present invention is directed to a method for producing a carbonaceous film, including the step of heat-treating a polymer film wound into a roll, wherein (1) at a temperature lower than a pyrolysis onset temperature of the polymer film, (1-1) a value determined for the whole roll-shaped polymer film by dividing a thickness of a gap between adjacent layers of the polymer film (Ts) by a thickness of the polymer film (Tf) (Ts/Tf) satisfies a relationship of Ts/Tf<0.33 or Ts/Tf>1.50 and (1-2) an area of a space inside a cross-sectional circle of the roll-shaped polymer film having a circumference whose center is located at a center of the roll-shaped polymer film and on which a point, at which a film length from an inner end of the roll-shaped polymer film is 50% of a total length of the polymer film, is located (the cross-sectional circle and the space are also referred to as the "50% cross-sectional circle" and the "space inside the 50% cross-sectional circle", respectively) is less than 25% of a cross-sectional area of the 50% cross-sectional circle, and (2) at a temperature equal to or higher than a pyrolysis onset temperature of the polymer film but equal to or lower than a temperature at which a weight of the polymer film is reduced by 40% as compared to that before start of heat treatment, the roll-shaped polymer film has (2-1) a gap between layers of the polymer film so that a value determined for the whole roll-shaped polymer film by dividing a thickness of the gap between adjacent layers of the polymer film (Ts) by a thickness of the polymer film (Tf) (Ts/Tf) satisfies a relationship of 0.33≤Ts/Tf≤1.50 and/or (2-2) a space inside a cross-sectional circle of the roll-shaped polymer film having a circumference whose center is located at a center of the roll-shaped polymer film and on which a point, at which a film length from an inner end of the roll-shaped polymer film is 50% of a total length of the polymer film, is located (the cross-sectional circle and the space are also referred to as the "50% cross-sectional circle" and the "space inside the 50% cross-sectional circle", respectively) so that an area of the space inside the 50% cross-sectional circle is 25% or more of a cross-sectional area of the 50% cross-sectional circle.

In the above production method, it is preferred that the roll-shaped polymer film has a core and that an outer diameter of the core is reduced at a temperature equal to or higher than the pyrolysis onset temperature but equal to or lower than a temperature at which a weight of the polymer film is reduced by 40% as compared to that before start of heat treatment.

The present invention is also directed to a method for producing a graphite film, including heat-treating a carbonaceous film produced by the above-described production method to a temperature of 2400° C. or higher.

Effects of the Invention

The production method according to the present invention makes it possible to reduce close contact between polymer film layers caused by shrinkage during carbonization/decomposition in a carbonization process and therefore to easily discharge a decomposition gas produced by carbonization from between the film layers. This makes it possible to obtain a roll-shaped carbonaceous film and a roll-shaped graphite film while suppressing the occurrence of fusion bonding.

PREFERRED MODE FOR CARRYING OUT THE INVENTION

Figure 1:
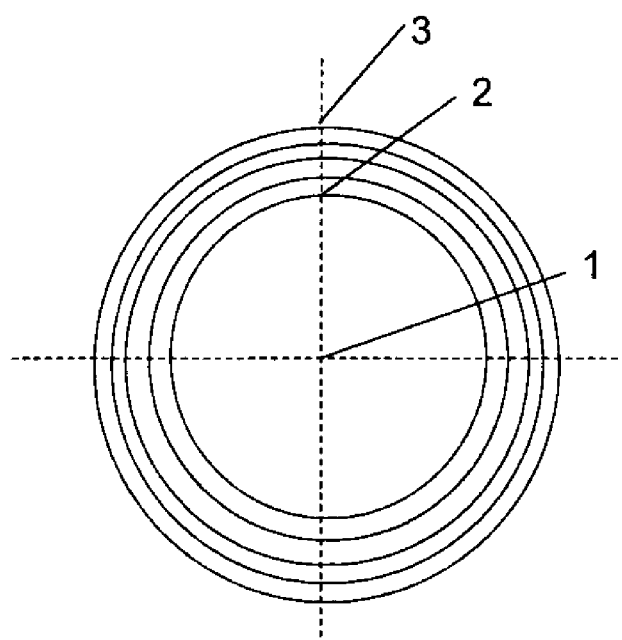
FIG. 1 is a diagram showing the end surface of a roll-shaped polymer film (having no core) used in the present invention.

The reason why fusion bonding may occur in a roll-shaped carbonaceous film is as follows: when a polymer film is wound into a roll, film layers press against one another due to shrinkage during carbonization/decomposition, and therefore a decomposition gas produced during carbonization/decomposition cannot be discharged from between the film layers. The shrinkage during carbonization/decomposition tends to increase toward the inner side of the roll, and therefore the pressing of polymer film layers against one another is particularly notable near the inner periphery of the roll. For this reason, fusion bonding in a roll-shaped carbonaceous film is more likely to occur near the inner periphery of the roll-shaped carbonaceous film.

According to the present invention, a space is formed in a roll-shaped polymer film at a temperature equal to or higher than the pyrolysis onset temperature of the polymer film so that pressing of film layers against one another caused by shrinkage during carbonization/decomposition can be reduced and therefore a decomposition gas produced during carbonization/decomposition can be efficiently discharged. This makes it possible to suppress the occurrence of fusion bonding in a resulting roll-shaped carbonaceous film.

More specifically, in the present invention, at a temperature equal to or higher than the pyrolysis onset temperature of the polymer film but equal to or lower than a temperature at which the weight of the polymer film is reduced by 40% as compared to that before start of heat treatment, the roll-shaped polymer film has (2-1) a gap between layers of the polymer film so that a value determined for the whole roll-shaped polymer film by dividing the thickness of the gap between adjacent layers of the polymer film (Ts) by the thickness of the polymer film (Tf) (Ts/Tf) satisfies a relationship of 0.33≤Ts/Tf≤1.50 and/or (2-2) a space inside a cross-sectional circle of the roll-shaped polymer film having a circumference whose center is located at the center of the roll-shaped polymer film and on which a point, at which the film length from the inner end of the roll-shaped polymer film is 50% of the total length of the polymer film, is located (the cross-sectional circle and the space are also referred to as the "50% cross-sectional circle" and the "space inside the 50% cross-sectional circle", respectively) so that the area of the space inside the 50% cross-sectional circle is 25% or more of the cross-sectional area of the 50% cross-sectional circle.

The term "roll-shaped" as used in the present invention refers to a state where the polymer film is wound into a roll, and the cross-sectional shape of the roll is not limited and may be, for example, a perfect circle, an ellipse, or a rectangle.

(Value Determined by Dividing Thickness of Gap Between Adjacent Layers of Polymer Film (Ts) by Thickness of Polymer Film (Tf) (Ts/Tf))

The gap between adjacent layers of the polymer film is provided so that the roll-shaped polymer film satisfies, as a whole, a relationship that a value determined by dividing the thickness of the gap between adjacent layers of the polymer film (Ts) by the thickness of the polymer film (Tf) (Ts/Tf) is preferably 0.33 or more, more preferably 0.50 or more, even more preferably 0.60 or more. The upper limit of Ts/Tf is not particularly limited.

Further, when Ts/Tf is 0.33 to 1.50, rippling of the carbonaceous film can also be suppressed. Ripping of the carbonaceous film occurs due to shrinkage of the polymer film during carbonization/decomposition when the polymer film has a high degree of freedom of motion, and as a result, the carbonaceous film has surface irregularities and therefore has a wavy appearance when viewed from the end of the roll of the carbonaceous film. That is, limiting the gap between film layers to some extent is effective at suppressing rippling. In order to suppress the rippling of the carbonaceous film, Ts/Tf is preferably 1.50 or less, more preferably 1.00 or less, even more preferably 0.90 or less. When Ts/Tf is 0.33 or more, fusion bonding can be improved, and when Ts/Tf is 1.50 or less, rippling of the carbonaceous film can be suppressed.

The above-described Ts/Tf is a value determined for the whole roll-shaped polymer film.

(Method for Measuring Ts/Tf)

<1> When a winding core is present, the outer diameter (Rs) of the winding core is measured (hereinafter, the winding core is also referred to as the "core").

<2> The outer peripheral end of the roll-shaped polymer film is fixed so as not to move, and then the inner diameter (Ra) and outer diameter (Rb) of the roll-shaped polymer film are measured. In the measurement of these diameters, an average value of the length of a line segment on a straight line passing through the center of the roll-shaped polymer film and the outermost end of the roll-shaped polymer film and the length of a line segment on a straight line orthogonal to the above straight line is used. Here, the outermost end refers to the outer peripheral end of the roll-shaped polymer film farthest from the center of the roll-shaped polymer film.

It is to be noted that in the present invention, when a diameter or thickness relating to the roll-shaped film is measured, as described above, an average value of the length of a line segment on a straight line passing through the center of the roll-shaped polymer film and the outermost end of the roll-shaped polymer film and the length of a line segment on a straight line orthogonal to the above straight line is used in either case.

<3> When a gap is present in the roll-shaped polymer film, Ts/Tf is determined in the following manner. A core is placed on the inner peripheral side of the roll-shaped polymer film, and the polymer film is started to be wound from the inner end thereof around the core without forming any gap between polymer film layers while a tension of 10 N/m or more is applied to the polymer film. While the polymer film is wound around the core in this way, the winding thickness 610(A) of the polymer film wound around the core and the winding thickness 600(B) of the roll-shaped polymer film, located on the outer peripheral side of the polymer film wound around the core, after winding the polymer film around the core are measured every time the number of unwound turns of the roll-shaped polymer film started to be wound from the inner end thereof reaches 10.

Here, when the winding thickness of the polymer film wound around the core measured when the number of unwound turns first reaches 10 is defined as $A_1$, the winding thickness of the polymer film wound around the core measured when the number of unwound turns reaches 10 n is $A_n$. Similarly, the winding thickness of the roll-shaped polymer film after winding the polymer film around the core measured when the number of unwound turns reaches 10 n is $B_n$.

These thicknesses are measured using a calibrated vernier caliper by bringing the vernier caliper into contact with the polymer film without applying pressure to the polymer film. It is to be noted that the thickness of the roll-shaped polymer film is determined by averaging the thicknesses of the roll-shaped polymer film measured at four points at which two straight lines passing through and orthogonally intersecting at the center of the roll-shaped polymer film intersect with the roll-shaped polymer film.

<4> The cross-sectional area of the polymer film wound around the core is identical to that of the polymer film unwound from the roll-shaped polymer film, and therefore the cross-sectional area of the gap (space) formed between polymer film layers is determined by determining the difference between the cross-sectional area of a portion of the roll-shaped polymer film from which the polymer film is unwound and the cross-sectional area of the polymer film unwound from the portion of the roll-shaped polymer film and then wound around the core. Further, the ratio of the gap formed per length of 10 turns of the polymer film (i.e., Ts/Tf) can be determined by the following formula, that is, by dividing the cross-sectional area of the gap formed between polymer film layers by the cross-sectional area of the polymer film. It is to be noted that the ratio of the gap present between the inner end and a certain point (e.g., a point at which the film length from the inner end of the roll-shaped polymer film is 50% of the total length of the polymer film) of the roll-shaped polymer film can be determined by plotting the values of the gap formation ratio on a graph.

$$T_s/T_f=((Ra/2+B_n)^2\pi-(Ra/2+B_{n-1})^2\pi-((Rs/2+A_n)^2\pi-(Rs/2+A_{n-1})^2\pi))/((Rs/2+A_n)^2\pi-(Rs/2+A_{n-1})^2\pi))$$ [Formula 1]

<5> The winding thickness of the polymer film wound around the core is measured after the whole polymer film is wound around the core without any gap to finally determine the cross-sectional area of the whole polymer film wound around the core without any gap.

The point, at which the film length from the inner peripheral end of the roll-shaped polymer film is 50% of the total length of the polymer film, can be determined from the cross-sectional area of the whole polymer film determined above, and the ratio of the gap formed between the inner peripheral end and the above-determined point of the roll-shaped polymer film can also be determined.

It is to be noted that when the roll-shaped polymer film has an elliptical cross-sectional shape or a cross-sectional shape other than a circle, the measurement steps <1> to <5> are performed by allowing the roll-shaped polymer film to have a cross-sectional shape close to a circle so that the length of a line segment on a straight line passing through the center of the roll-shaped polymer film and the outermost end of the roll-shaped polymer film and the length of a line segment on a straight line orthogonal to the above straight line are substantially uniform.

(Space Inside 50% Cross-Sectional Circle of Roll-Shaped Polymer Film)

Figure 2:
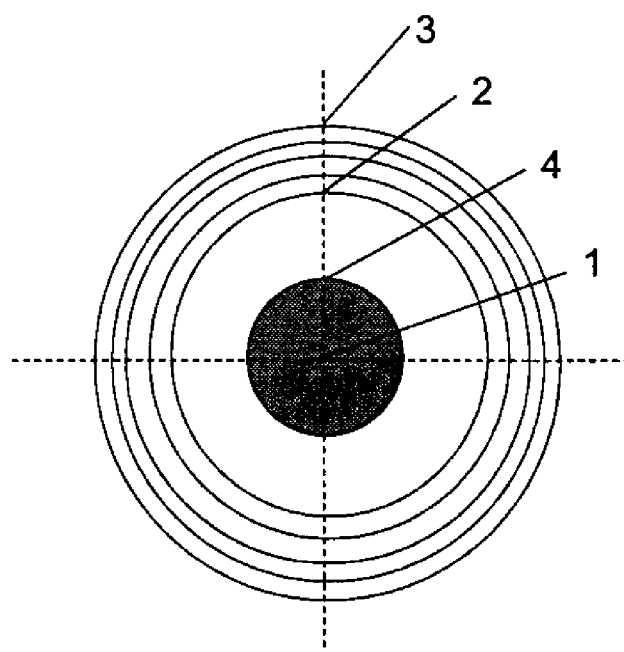
FIG. 2 is a diagram showing the end surface of a roll-shaped polymer film (having a core) used in the present invention.
Figure 3:
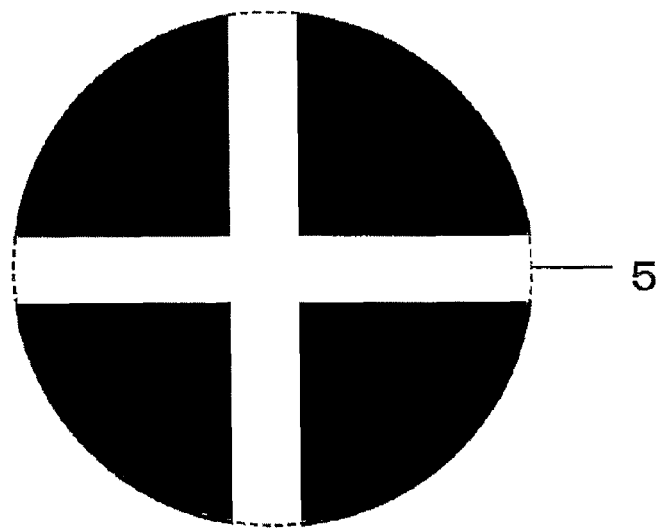
FIG. 3 is a diagram showing the end surface of a splittable core usable for a roll-shaped polymer film used in the present invention.

When the roll-shaped polymer film does not have a core, as shown in FIG. 1, the space in the roll-shaped polymer film refers to a space present between a point 3 (i.e., a point located on the outermost periphery of the roll-shaped polymer film) and a central point 1 of the roll-shaped polymer film. When the roll-shaped polymer film has a core, as shown in FIG. 2, the space in the roll-shaped polymer film refers to a space present between an outer periphery 4 of the core and the point 3 located on the outermost periphery of the roll-shaped polymer film. In the present invention, as a core for the roll-shaped polymer film, such a splittable core as shown in FIG. 3 can be used. The splittable core is formed by dividing an integrally-formed core along the center line of the core into a plurality of core parts. The splittable core can have a larger outer diameter than the integrally-formed core by arranging the individual core parts with gaps therebetween. When such a splittable core has a circular cross-sectional shape, as shown in FIG. 3, the outer diameter of a nearly circular shape formed by drawing dotted lines connecting together the individual core parts in the gaps between the individual core parts is defined as the outer diameter of the splittable core at the time when the core parts are arranged with gaps therebetween.

The point at which the film length from the inner end of the roll-shaped polymer film is 50% of the total length of the polymer film refers to a point at which, when the polymer film having a length of, for example, 100 m is wound into a roll, the distance from the innermost periphery (innermost end) toward the outer periphery of the roll-shaped polymer film is 50 m.

When the roll-shaped polymer film does not have a core, as shown in FIG. 1, the space inside the 50% cross-sectional circle refers to a space present between the point at which the film length from the inner end of the roll-shaped polymer film is 50% of the total length of the polymer film and the central point 1 of the roll-shaped polymer film. When the roll-shaped polymer film has a core, as shown in FIG. 2, the space inside the 50% cross-sectional circle refers to a space present between the outer periphery 4 of the core and the point at which the film length from the inner end of the roll-shaped polymer film is 50% of the total length of the polymer film.

Examples of the space in the roll-shaped polymer film include a gap formed between film layers of the roll-shaped polymer film and a gap formed between the innermost periphery of the roll-shaped polymer film and the outer periphery of the core.

(Ratio of Space Inside 50% Cross-Sectional Circle of Roll-Shaped Polymer Film)

The ratio of the space inside the 50% cross-sectional circle of the roll-shaped polymer film is preferably 25% or more, more preferably 35% or more, even more preferably 50% or more of the cross-sectional area of the 50% cross-sectional circle. When the ratio of the space inside the 50% cross-sectional circle is 25% or more, a decomposition gas produced during carbonization/decomposition can be efficiently discharged, and therefore the occurrence of fusion bonding in the roll-shaped carbonaceous film can be suppressed.

Further, there is a case where rippling occurs in the roll-shaped carbonaceous film due to deformation caused by shrinkage during carbonization/decomposition in a carbonization process. In order to improve the rippling of the carbonaceous film, the ratio of the space inside the 50% cross-sectional circle of the roll-shaped polymer film is preferably 80% or less, more preferably 70% or less, even more preferably 60% or less, most preferably 55% or less. In order to improve both fusion bonding and rippling in the roll-shaped carbonaceous film, the ratio of the space inside the 50% cross-sectional circle of the roll-shaped polymer film is preferably 25% or more but 80% or less, more preferably 35% or more but 70% or less, even more preferably 50% or more but 60% or less, most preferably 50% or more but 55% or less.

(Temperature at which Space is Formed in Roll-Shaped Polymer Film)

In the present invention, a temperature at which a space is formed in the roll-shaped polymer film is equal to or higher than the pyrolysis onset temperature of the polymer film but equal to or lower than a temperature at which the weight of the polymer film is reduced by 40% as compared to that before start of heat treatment.

The pyrolysis onset temperature of the polymer film is defined as a temperature at which the weight of the polymer film is reduced by 1.0% as compared to that measured at room temperature (23° C., 50% humidity) before start of heat treatment. More specifically, the pyrolysis onset temperature is a temperature at which the weight of the polymer film is reduced by 1.0% when the polymer film is subjected to heat treatment from room temperature (23° C.) to 1000° C. using a thermal analysis system EXSTAR6000 and a thermogravimetric measurement device TG/DTA 220U, which are manufactured by SII NanoTechnology Inc., under the conditions of a sample amount of 10 mg, a flowing nitrogen atmosphere (200 mL/min), and a temperature rise rate of 10° C./min.

In the case of a polyimide film (APICAL AH manufactured by KANEKA CORPORATION, 75 μm) used in Examples of the present invention, the pyrolysis onset temperature is about 500° C. The pyrolysis onset temperature was measured in accordance with the above definition.

As described above, a temperature at which a space is formed in the roll-shaped polymer film is equal to or higher than a temperature at which the weight of the polymer film is reduced by 1.0% as compared to that before start of heat treatment, and the upper limit thereof is preferably equal to or lower than a temperature at which the weight of the polymer film is reduced by 40%, more preferably equal to or lower than a temperature at which the weight of the polymer film is reduced by 20%, even more preferably equal to or lower than a temperature at which the weight of the polymer film is reduced by 10%, particularly preferably equal to or lower than a temperature at which the weight of the polymer film is reduced by 3.0%, most preferably equal to or lower than a temperature at which the weight of the polymer film is reduced by 2.0% as compared to that measured at room temperature (23° C., 50% humidity) before start of heat treatment.

For example, in the case of a polyimide film (APICAL AH manufactured by KANEKA CORPORATION, 75 μm) used in Examples of the present invention, the relationship between the above weight reduction ratio and the temperature is as follows: the temperature at which the weight reduction ratio is 40% is 800° C., the temperature at which the weight reduction ratio is 20% is 650° C., the temperature at which the weight reduction ratio is 10% is 600° C., the temperature at which the weight reduction ratio is 2.0% is 570° C., the temperature at which the weight reduction ratio is 1.2% is 550° C., and the temperature at which the weight reduction ratio is 1.0% is 500° C.

In the present invention, pressing of film layers against one another during pyrolysis can be further reduced by forming a space in the roll-shaped polymer film at an earlier stage after start of pyrolysis of the polymer film, which makes it possible to suppress the occurrence of fusion bonding.

In the present invention, the polymer film shall satisfy the following requirements at a temperature lower than the pyrolysis onset temperature of the polymer film: (1-1) Ts/Tf satisfies a relationship of Ts/Tf<0.33 or Ts/Tf>1.50 and (1-2) the area of the space inside the 50% cross-sectional circle is less than 25% of the cross-sectional area of the 50% cross-sectional circle. In regard to (1-1), Ts/Tf is preferably less than 0.30, more preferably less than 0.25, even more preferably less than 0.22, even more preferably less than 0.20, particularly preferably less than 0.16.

(Position where Space is Formed in Roll-Shaped Polymer Film)

Fusion bonding is likely to occur particularly near the inner periphery. Therefore, forming a space nearer the inner periphery is more effective at suppressing the occurrence of fusion bonding when the cross-sectional area of the space is constant.

It is to be noted that a space may or may not be formed outside the 50% cross-sectional circle. However, a space is preferably formed also outside the 50% cross-sectional circle because fusion bonding can be more easily reduced.

(Method for Forming Space)

A method for forming a space is not particularly limited, but a space is preferably formed without damaging the polymer film. Examples of such a method include: 1) a method in which the outer diameter of a core, around which the polymer film is wound, is reduced at a temperature equal to or higher than the pyrolysis onset temperature of the polymer film to form a gap between the core and the roll-shaped polymer film; 2) a method in which a tube having an inner diameter larger than the outer diameter of the roll-shaped polymer film is placed outside the roll-shaped polymer film, and the outer peripheral end of the roll-shaped polymer film is fixed to the tube, and the tube is rotated in a direction opposite to the winding direction of the roll-shaped polymer film at a temperature equal to or higher than the pyrolysis onset temperature of the polymer film to form a space between a core and the roll-shaped polymer film or between film layers; and 3) a method in which rewinding is performed in a heating furnace.

For example, when a space is formed in the roll-shaped polymer film by reducing the outer diameter of a core according to the above method 1), the diameter of the core is not particularly limited, but a value determined by dividing the reduced outer diameter of the core (Rs) by the inner diameter of the roll-shaped polymer film (Rf) (Rs/Rf) is preferably in a specific range. More specifically, the value is preferably 0.90 or less, more preferably 0.80 or less, even more preferably 0.70 or less, and the lower limit of the value is not particularly limited. When Rs/Rf is 0.90 or less, pressing of film layers against one another during carbonization/decomposition can be reduced, which makes it possible to effectively suppress the occurrence of fusion bonding.

<Material of Core>

The material of the core is first required to withstand continuous use at 500° C. or higher. Examples of the material of the container satisfying this requirement include ceramics such as alumina ($Al_2O_3$), zirconia ($ZrO_2$), quartz ($SiO_2$), silicon carbide (SiC), titania ($TiO_2$), magnesia (MgO), silicon nitride ($Si_3N_4$), aluminum nitride (AlN), yttria ($Y_2O_3$), mullite ($3Al_2O_3.2SiO_2$), cordierite ($2MgO.2Al_2O_3.5SiO_2$), steatite ($MgO.SiO_2$), and forsterite ($2MgO.SiO_2$). Further, when a carbonization process and a graphitization process are continuously performed, a material that can withstand continuous use at 2000° C. or higher, preferably 2800° C. or higher is preferably used. Examples of such a material include a woven fabric or felt of carbon fibers, a C/C composite material obtained by reinforcing graphite with carbon fibers, and an isotropic graphite material such as an extruded article, a molded article, or a cold isostatic pressed article.

Further, the tensile elastic modulus of the core material is preferably 30 GPa or more. When the tensile elastic modulus is 30 GPa or more, the deformation of the polymer film due to shrinkage during carbonization can be suppressed and therefore rippling can be suppressed.

In regard to the shape of the core, the inner surface of the core preferably has less surface irregularities, and the cross-sectional shape of the core is preferably close to a circle and is particularly preferably a perfect circle.

(Heat Treatment Method)

The carbonaceous film according to the present invention is obtained through a carbonization process. The carbonization process is a process in which the polymer film is preliminarily heated to a temperature of about 1000° C. to thermally decompose the polymer film to obtain a carbonaceous film. The obtained carbonaceous film is a glassy film whose weight is about 60% of that of the polymer film.

The heat treatment in the carbonization process can be performed in an inert gas atmosphere or a vacuum atmosphere. When the temperature of the atmosphere is equal to or higher than the pyrolysis onset temperature, introduction of an inert gas is particularly effective. Particularly, a furnace preferably has such a structure that an inert gas is introduced into the furnace while a gas in the furnace is discharged to the outside of the furnace. At a temperature equal to or higher than the pyrolysis onset temperature, a decomposition gas causing fusion bonding is produced. Therefore, when an inert gas is introduced into a furnace at a temperature equal to or higher than the pyrolysis onset temperature, the inert gas enters a gap between layers of the film produced by the production method according to the present invention so that a decomposition gas produced during carbonization/decomposition is pushed out of a system. Further, the pushed-out decomposition gas is discharged to the outside of the furnace together with the inert gas, which makes it possible to reduce the risk of newly causing fusion bonding.

The flow rate of the introduced inert gas is not particularly limited, but is preferably 1 L/min or more, more preferably 3 L/min or more, even more preferably 5 L/min or more.

Further, a graphite film can be obtained by graphitizing the obtained carbonaceous film in a graphitization process. The graphitization process is a process in which the carbonized film produced in the carbonization process is heated to a temperature of 2400° C. or higher to be graphitized. This process makes it possible to graphitize the carbonaceous film to obtain a graphite film having high heat conductivity. When the carbonaceous film is changed to a graphite film, heat conductivity is significantly improved and an about 10% increase in size is achieved.

When a graphite film is produced from the polymer film, the carbonization process and the graphitization process may be continuously performed, or only the graphitization process may be singly performed after the completion of the carbonization process.

The heat treatment in the graphitization process can be performed in an inert gas atmosphere or a vacuum atmosphere. The carbonaceous film may be oriented horizontally or vertically, and the orientation of the carbonaceous film may be appropriately selected. Further, after carbonization, the core may be used also during graphitization or may be removed.

The roll-shaped carbonaceous film obtained in the carbonization process may be directly subjected to the graphitization process or may be cut into pieces of appropriate size and, if necessary, stacked before subjected to the graphitization process.

The obtained graphite film may further be subjected to a press process to impart excellent flexibility.

(Orientation of Polymer Film)

In the present invention, the roll-shaped polymer film may be oriented horizontally or vertically, and the orientation of the roll-shaped polymer film may be appropriately selected.

(Width of Polymer Film)

The width of the polymer film used in the present invention is not particularly limited, but is preferably 150 mm or more, more preferably 250 mm or more, even more preferably 500 mm or more. When the width of the polymer film is 150 mm or more, fusion bonding is likely to occur. However, the occurrence of fusion bonding can be effectively suppressed by employing the production method according to the present invention.

EXAMPLES

<Evaluation>
(Fusion Bonding)

The occurrence of fusion bonding in a roll-shaped carbonaceous film was evaluated according to the following criteria:
A: fusion bonding was not observed;
B: fusion bonding was observed in 2 to 3 film layers;
C: fusion bonding was observed in 4 to 19 film layers;
D: fusion bonding was observed in 20 to 30 film layers; and
E: fusion bonding was observed in 31 or more film layers.

Similarly, the occurrence of fusion bonding in a roll-shaped graphite film was evaluated according to the following criteria:
A: fusion bonding was not observed;
B: fusion bonding was observed in 2 to 3 film layers;
C: fusion bonding was observed in 4 to 19 film layers;
D: fusion bonding was observed in 20 to 30 film layers; and
E: fusion bonding was observed in 31 or more film layers.

(Rippling)

Rippling of the carbonaceous film was evaluated according to the following criteria:
A: the degree of rippling of the carbonaceous film when viewed from the end of the roll was equal to or less than that shown by the reference sign 200 in FIG. 4; and
B: the degree of rippling of the carbonaceous film when viewed from the end of the roll was more than that shown by the reference sign 200 in FIG. 4 but equal to or less than that shown by the reference sign 210 in FIG. 4.

Similarly, fusion bonding of the graphite film was evaluated according to the following criteria:
A: the degree of rippling of the graphite film when viewed from the end of the roll was equal to or less than that shown by the reference sign 200 in FIG. 4; and
B: the degree of rippling of the graphite film when viewed from the end of the roll was more than that shown by the reference sign 200 in FIG. 4 but equal to or less than that shown by the reference sign 210 in FIG. 4.

Example 1

Figure 5:
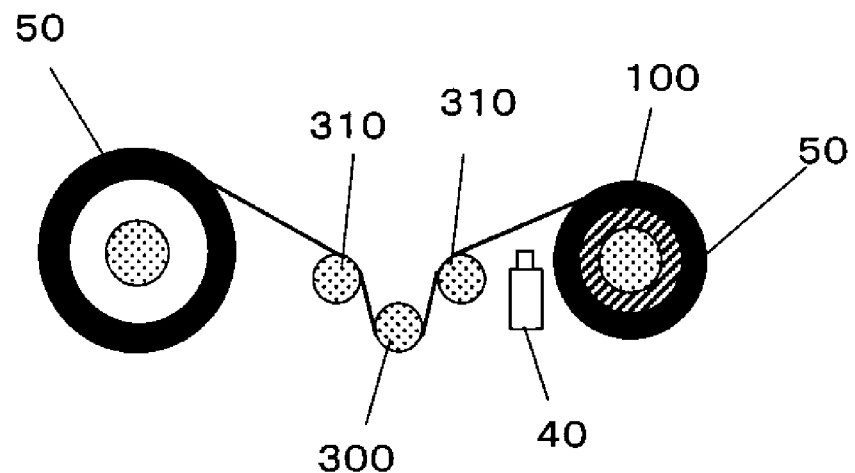
FIG. 5 is a diagram showing how to rewind a polymer film in Example 1 of the present invention.

As a polymer film 50, a polyimide film manufactured by KANEKA CORPORATION and having a width of 250 mm and a length of 100 m (trade name: APICAL 75AH, thickness: 75 μm, corresponding to a pyrolysis onset temperature of 500° C.) was prepared. As shown in FIG. 5, the polymer film 50 was wound up around a core 100 having a diameter of 80 mm under the conditions of a tension of 80 N/m and a winding rate of 10 m/min while one of the surfaces of the film was diselectrified by a diselectrifying device 40. It is to be noted that the tension was detected using a pick-up roller 300 shown in FIG. 5.

After the winding up, the thus obtained roll-shaped polymer film was placed inside a tube having an inner diameter of 130 mm, and the polymer film was rewound along the inner surface of the tube so that polymer film layers were in close contact with one another. After the whole polymer film was rewound, the core 100 was removed. The thus prepared roll-shaped polymer film had an inner diameter φ of 100 mm and no gap between polymer film layers.

Figure 6:
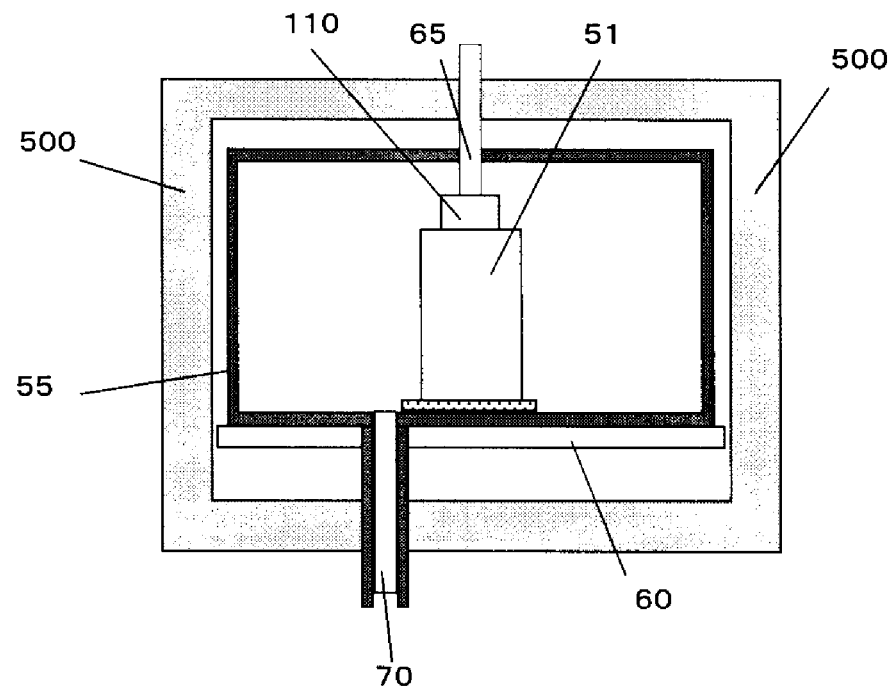
FIG. 6 is a diagram showing how to perform heat treatment in Example 1 of the present invention.
Figure 7:
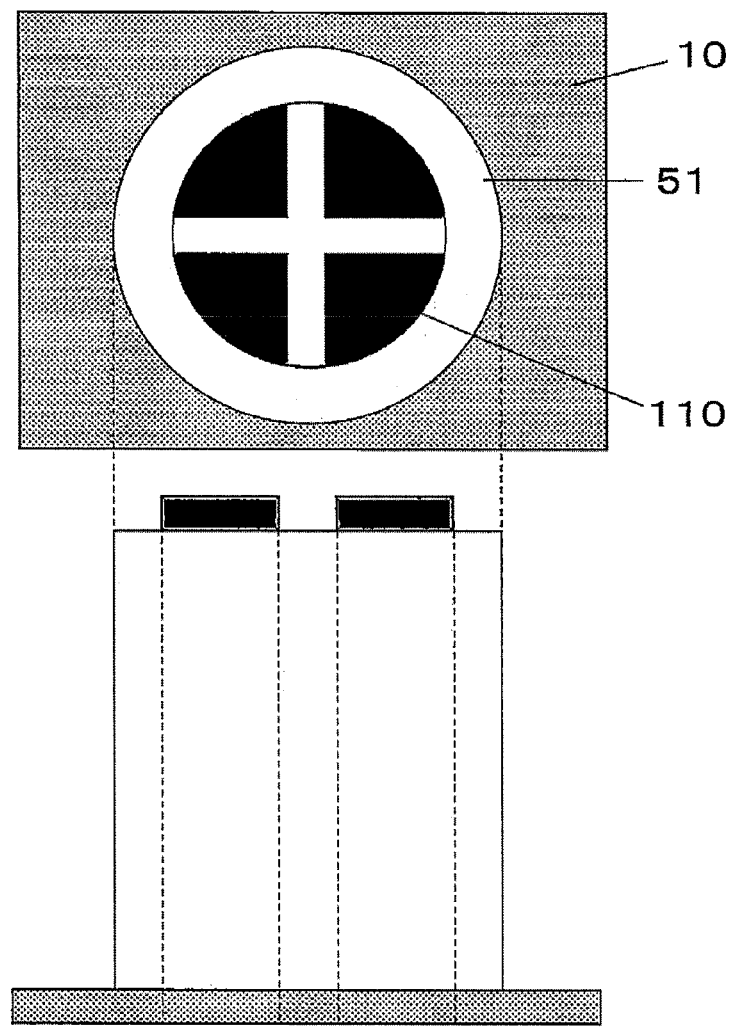
FIG. 7 is a diagram showing a state before reducing a core diameter in Example 1 of the present invention.
Figure 8:
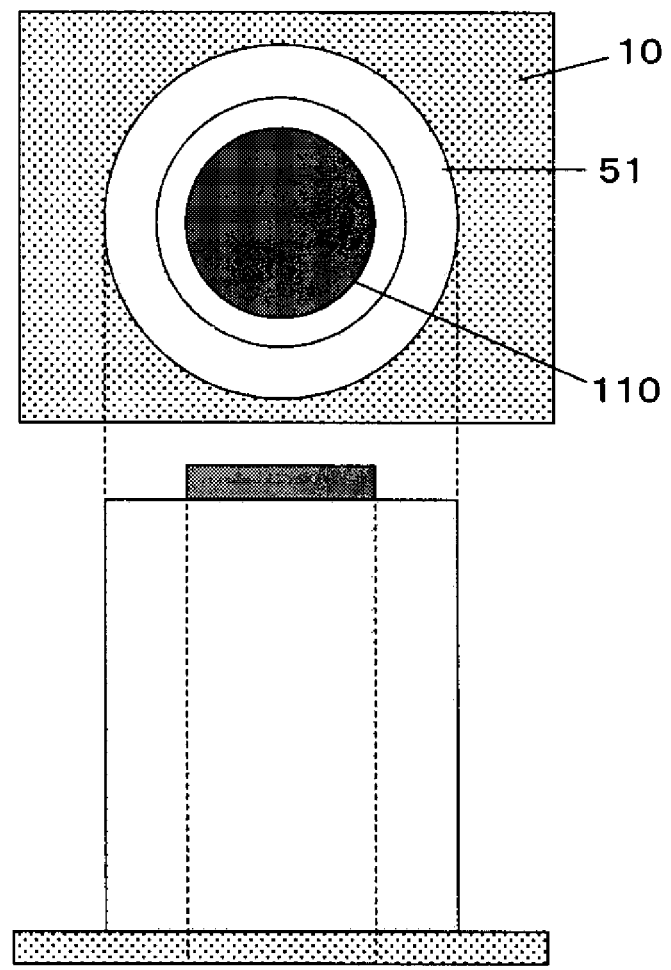
FIG. 8 is a diagram showing a state after reducing a core diameter in Example 1 of the present invention.

Then, as shown in FIG. 6, this roll-shaped polymer film was vertically set in an indirect heating furnace, and a 4-part split core 110 was placed at the center of the roll of the polymer film, which is more specifically shown in FIG. 7. As shown in FIG. 7, the outer diameter of the core was set to 100 mm by providing gaps between the individual core parts. A heater 500 located outside the roll-shaped polymer film was electrically heated to increase the temperature from room temperature to 1000° C. at a temperature rise rate of 1° C./min while a nitrogen gas was introduced at a flow rate of 5 L/min to perform carbonization treatment. In this regard, the nitrogen gas is introduced through an inlet 65, and therefore exhaust gas flows toward a pipe 70. It is to be noted that the outer diameter of the core was reduced to 70 mm by uniting the 4 core parts as shown in FIG. 8 when the temperature reached 500° C.

After the core was removed, the thus produced roll-shaped carbonaceous film was vertically set in the indirect heating furnace and subjected to graphitization treatment by increasing the temperature to 2900° C. at a temperature rise rate of 0.5° C./min to produce a roll-shaped graphite film.

The results are shown in Table 1.

Example 2

A roll-shaped graphite film was produced in the same manner as in Example 1 except that the diameter of the core was reduced at 550° C. (corresponding to a weight reduction ratio of 1.2% in the case of the polyimide film used in this example). The results are shown in Table 1.

Example 3

A roll-shaped graphite film was produced in the same manner as in Example 1 except that the diameter of the core was reduced at 570° C. (corresponding to a weight reduction ratio of 2.0% in the case of the polyimide film used in this example). The results are shown in Table 1.

Example 4

A roll-shaped graphite film was produced in the same manner as in Example 1 except that the diameter of the core was reduced at 600° C. (corresponding to a weight reduction ratio of 10% in the case of the polyimide film used in this example). The results are shown in Table 1.

Example 5

A roll-shaped graphite film was produced in the same manner as in Example 1 except that the diameter of the core was reduced at 650° C. (corresponding to a weight reduction ratio of 20% in the case of the polyimide film used in this example). The results are shown in Table 1.

Example 6

A roll-shaped graphite film was produced in the same manner as in Example 1 except that the diameter of the core was reduced at 700° C. (corresponding to a weight reduction ratio of 28% in the case of the polyimide film used in this example). The results are shown in Table 1.

Example 7

A roll-shaped graphite film was produced in the same manner as in Example 1 except that the diameter of the core was reduced at 800° C. (corresponding to a weight reduction ratio of 40% in the case of the polyimide film used in this example). The results are shown in Table 1.

Comparative Example 1

A roll-shaped graphite film was produced in the same manner as in Example 1 except that the diameter of the core was not changed. The results are shown in Table 1.

Comparative Example 2

A roll-shaped graphite film was produced in the same manner as in Example 1 except that the diameter of the core was reduced at 1000° C. (corresponding to a weight reduction ratio of 45% in the case of the polyimide film used in this example). The results are shown in Table 1.

Reference Example 1

A roll-shaped graphite film was produced in the same manner as in Example 1 except that the diameter of the core was reduced at 450° C. (corresponding to a weight reduction ratio of 0% in the case of the polyimide film used in this example). The results are shown in Table 1.

Reference Example 2

A roll-shaped graphite film was produced in the same manner as in Example 1 except that the diameter of the core was reduced at room temperature. The results are shown in Table 1.

TABLE 1

| | Polymer film | | Initial state | | | | After change in core diameter | | |
|---|---|---|---|---|---|---|---|---|---|
| | Thickness (Tf) μm | Inner diameter of roll mm | Outer diameter of core mm | Gap between polymer film layers (Ts) μm | Ts/Tf | Ratio of space in 50% cross-sectional circle % | Temperature at the time of change in core diameter ° C. | Weight reduction ratio % | Outer diameter of core after change mm |
| Example 1 | 75 | 100 | 100 | 0 | 0.00 | 0 | 500 | 1.0 | 70 |
| Example 2 | 75 | 100 | 100 | 0 | 0.00 | 0 | 550 | 1.2 | 70 |
| Example 3 | 75 | 100 | 100 | 0 | 0.00 | 0 | 570 | 2.0 | 70 |
| Example 4 | 75 | 100 | 100 | 0 | 0.00 | 0 | 600 | 10 | 70 |
| Example 5 | 75 | 100 | 100 | 0 | 0.00 | 0 | 650 | 20 | 70 |
| Example 6 | 75 | 100 | 100 | 0 | 0.00 | 0 | 700 | 28 | 70 |
| Example 7 | 75 | 100 | 100 | 0 | 0.00 | 0 | 800 | 40 | 70 |
| Comparative Example 1 | 75 | 100 | 100 | 0 | 0.00 | 0 | — | 0.0 | 100 |
| Comparative Example 2 | 75 | 100 | 100 | 0 | 0.00 | 0 | 1000 | 45 | 70 |

TABLE 1-continued

| | | | | | | | | | |
|---|---|---|---|---|---|---|---|---|---|
| Reference Example 1 | 75 | 100 | 100 | 0 | 0.00 | 0 | 450 | 0.0 | 70 |
| Reference Example 2 | 75 | 100 | 100 | 0 | 0.00 | 0 | R.T. | 0.0 | 70 |

| | After change in core diameter | | | Evaluations | | | | | |
|---|---|---|---|---|---|---|---|---|---|
| | | | | Carbonaceous film | | | Graphite film | | |
| | | | | Fusion bonding | | | Fusion bonding | | |
| | Gap between polymer film layers (Ts) μm | Ts/Tf | Ratio of space in 50% cross-sectional circle % | Number of film layers in which fusion bonding was observed | | Rippling | Number of film layers in which fusion bonding was observed | | Rippling |
| Example 1 | 0 | 0.00 | 52 | 0 | A | A | 0 | A | A |
| Example 2 | 0 | 0.00 | 52 | 0 | A | A | 0 | A | A |
| Example 3 | 0 | 0.00 | 52 | 3 | B | A | 3 | B | A |
| Example 4 | 0 | 0.00 | 52 | 13 | C | A | 13 | C | A |
| Example 5 | 0 | 0.00 | 52 | 18 | C | A | 18 | C | A |
| Example 6 | 0 | 0.00 | 52 | 26 | D | A | 26 | D | A |
| Example 7 | 0 | 0.00 | 52 | 30 | D | A | 30 | D | A |
| Comparative Example 1 | 0 | 0.00 | 0 | 50 | E | A | 50 | E | A |
| Comparative Example 2 | 0 | 0.00 | 52 | 50 | E | A | 50 | E | A |
| Reference Example 1 | 0 | 0.00 | 52 | 0 | A | A | 0 | A | A |
| Reference Example 2 | 0 | 0.00 | 52 | 0 | A | A | 0 | A | A |

In Comparative Example 1 in which the core diameter was not changed, fusion bonding was observed in 50 film layers. In Comparative Example 2, the core diameter was reduced at 1000° C. (weight reduction ratio: 45%), but this was not effective at suppressing fusion bonding because fusion bonding was observed in 50 film layers as in the case of Comparative Example 1. On the other hand, in Examples 1 to 7, the core diameter was reduced at a temperature of 800° C. (weight reduction ratio: 40%) or lower, which was effective at improving fusion bonding. As can be seen from the results of Examples 1 to 7, fusion bonding can be improved by forming a space in the roll-shaped polymer film by reducing the core diameter during carbonization/decomposition. Particularly, in Examples 1 to 3, the core diameter was reduced at a temperature at which carbonization/decomposition did not yet significantly proceed, which was very effective at improving fusion bonding.

Example 8

A roll-shaped graphite film was produced in the same manner as in Example 1 except that the diameter of the core was reduced to 90 mm. The results are shown in Table 2.

Example 9

A roll-shaped graphite film was produced in the same manner as in Example 8 except that the diameter of the core was reduced to 80 mm. The results are shown in Table 2.

Example 10

A roll-shaped graphite film was produced in the same manner as in Example 8 except that the diameter of the core was reduced to 60 mm. The results are shown in Table 2.

TABLE 2

| | Polymer film | | | Initial state | | | After change in core diameter | | |
|---|---|---|---|---|---|---|---|---|---|
| | Thickness (Tf) μm | Inner diameter of roll mm | Outer diameter of core mm | Gap between polymer film layers (Ts) μm | Ts/Tf | Ratio of space in 50% cross-sectional circle % | Temperature at the time of change in core diameter ° C. | Weight reduction ratio % | Outer diameter of core after change mm |
| Example 8 | 75 | 100 | 100 | 0 | 0.00 | 0 | 500 | 1.0 | 90 |
| Example 9 | 75 | 100 | 100 | 0 | 0.00 | 0 | 500 | 1.0 | 80 |
| Example 10 | 75 | 100 | 100 | 0 | 0.00 | 0 | 500 | 1.0 | 60 |

TABLE 2-continued

| | | After change in core diameter | | | Evaluations | | | | |
| --- | --- | --- | --- | --- | --- | --- | --- | --- | --- |
| | | | | | Carbonaceous film | | | Graphite film | |
| | | | | | Fusion bonding | | | Fusion bonding | |
| | | Gap between polymer film layers (Ts) μm | Ts/Tf | Ratio of space in 50% cross-sectional circle % | Number of film layers in which fusion bonding was observed | | Rippling | Number of film layers in which fusion bonding was observed | Rippling |
| Example 8 | | 0 | 0.00 | 28 | 10 | C | A | 10 | C | A |
| Example 9 | | 0 | 0.00 | 43 | 3 | B | A | 3 | B | A |
| Example 10 | | 0 | 0.00 | 57 | 0 | A | B | 0 | A | B |

As a result of comparison among Examples 8 to 10, the effect of suppressing fusion bonding was higher when the core diameter after change was smaller. The reason for this is considered to be that when the core diameter after change was smaller, a larger space was formed in the roll-shaped polymer film, and therefore pressing of film layers against one another during carbonization/decomposition could be further reduced. However, in the case of Example 10 using a core having a diameter of 60 mm, the space in the roll-shaped polymer film was large, and therefore rippling slightly occurred in the carbonaceous film and the graphite film.

Example 11

As a polymer film 50, a polyimide film manufactured by KANEKA CORPORATION and having a width of 250 mm and a length of 100 m (trade name: APICAL 75AH, thickness: 75 μm, corresponding to a pyrolysis onset temperature of 500° C.) was prepared. As shown in FIG. 5, the polymer film 50 was wound up around a core 100 having a diameter of 70 mm under the conditions of a tension of 80 N/m and a winding rate of 10 m/min while one of the surfaces of the film was diselectrified by a diselectrifying device 40. It is to be noted that the tension was detected using a pick-up roller 300 shown in FIG. 5.

Then, as shown in FIG. 6, the thus obtained roll-shaped polymer film was vertically set in an indirect heating furnace, and a tube having an inner diameter of 130 mm was placed outside the roll-shaped polymer film.

A heater 500 located outside the roll-shaped polymer film was electrically heated to increase the temperature from room temperature to 1000° C. at a temperature rise rate of 1° C./min while a nitrogen gas was introduced at a flow rate of 5 L/min to perform carbonization treatment. In this regard, the nitrogen gas is introduced through an inlet 65, and therefore exhaust gas flows toward a pipe 70.

It is to be noted that, when the temperature reached 550° C., the outermost peripheral end of the polymer film was fixed to the tube and the polymer film was rewound along the inner surface of the tube so that gaps were present between all the film layers of a resulting roll-shaped polymer film. The thus prepared roll-shaped polymer film had a Ts/Tf value of 1.10 as determined by dividing the thickness of the gap between polymer film layers (Ts) by the thickness of the polymer film (Tf).

After the core was removed, the thus produced roll-shaped carbonaceous film was vertically set in the indirect heating furnace and subjected to graphitization treatment by increasing the temperature to 2900° C. at a temperature rise rate of 0.5° C./min to produce a roll-shaped graphite film.

The results are shown in Table 3.

Example 12

A roll-shaped graphite film was produced in the same manner as in Example 11 except that, when the temperature reached 550° C., gaps between film layers were formed only in the 50 meter-long outer peripheral part of the roll-shaped polymer film. The results are shown in Table 3.

TABLE 3

| | Polymer film | | | Initial state | | | After change in core diameter | | |
| --- | --- | --- | --- | --- | --- | --- | --- | --- | --- |
| | Thickness (Tf) μm | Inner diameter of roll mm | Outer diameter of core mm | Gap between polymer film layers (Ts) μm | Ts/Tf | Ratio of space in 50% cross-sectional circle % | Temperature at the time of change in core diameter °C. | Weight reduction ratio % | Outer diameter of core after change mm |
| Example 2 | 75 | 100 | 100 | 0 | 0.00 | 0 | 550 | 1.2 | 70 |
| Example 11 | 75 | 100 | 100 | 0 | 0.00 | 0 | 550 | 1.2 | 100 |
| Example 12 | 75 | 100 | 100 | 0 | 0.00 | 0 | 550 | 1.2 | 100 |

| | After change in core diameter | | | Evaluations | | | | |
| --- | --- | --- | --- | --- | --- | --- | --- | --- |
| | | | | Carbonaceous film | | | Graphite film | |
| | | | | Fusion bonding | | | Fusion bonding | |
| | Gap between polymer film layers (Ts) μm | Ts/Tf | Ratio of space in 50% cross-sectional circle % | Number of film layers in which fusion bonding was observed | | Rippling | Number of film layers in which fusion bonding was observed | Rippling |
| Example 2 | 0 | 0.00 | 52 | 0 | A | A | 0 | A | A |
| Example 11 | 83 | 1.10 | 52 | 0 | A | A | 0 | A | A |

TABLE 3-continued

| | | | | | | | | | | |
|---|---|---|---|---|---|---|---|---|---|---|
| Example 12 | 83 (only in 50 meter-long outer peripheral part) | 0.55 | 0 | 0 | A | A | 0 | A | A | |

In Example 11, as a space in the roll-shaped polymer film, gaps were formed between polymer film layers, and as a result, the same results as Example 2, in which a space was formed between the core and the innermost periphery of the roll-shaped polymer film, could be obtained. In Example 12, as a space in the roll-shaped polymer film, gaps between polymer film layers were formed only in the 50 meter-long outer peripheral part of the roll-shaped polymer film, and as a result, the same results as Examples 2 and 11 could be obtained.

Comparative Example 3

A roll-shaped graphite film was produced in the same manner as in Example 1 except that the diameter of the core was reduced to 95 mm. The results are shown in Table 4.

Comparative Example 4

As a polymer film 50, a polyimide film manufactured by KANEKA CORPORATION and having a width of 250 mm and a length of 100 m (trade name: APICAL 75AH, thickness: 75 μm, corresponding to a pyrolysis onset temperature of 500° C.) was prepared. As shown in FIG. 5, the polymer film 50 was wound up around a core 100 having a diameter of 80 mm under the conditions of a tension of 80 N/m and a winding rate of 10 m/min while one of the surfaces of the film was diselectrified by a diselectrifying device 40. It is to be noted that the tension was detected using a pick-up roller 300 shown in FIG. 5.

After the winding up, the thus obtained roll-shaped polymer film was placed inside a tube having an inner diameter of 130 mm, and the polymer film was rewound along the inner surface of the tube so that polymer film layers were in close contact with one another. After the whole polymer film was rewound, the core 100 was removed. The thus prepared roll-shaped polymer film had an inner diameter φ of 100 mm and no gap between polymer film layers.

Then, as shown in FIG. 6, this roll-shaped polymer film was vertically set in an indirect heating furnace, and an unsplit core having a diameter of 95 mm was placed at the center of the roll of the polymer film, which is more specifically shown in FIG. 8. A heater 500 located outside the roll-shaped polymer film was electrically heated to increase the temperature from room temperature to 1000° C. at a temperature rise rate of 1° C./min while a nitrogen gas was introduced at a flow rate of 5 L/min to perform carbonization treatment. In this regard, the nitrogen gas is introduced through an inlet 65, and therefore exhaust gas flows toward a pipe 70.

After the core was removed, the thus produced roll-shaped carbonaceous film was vertically set in the indirect heating furnace and subjected to graphitization treatment by increasing the temperature to 2900° C. at a temperature rise rate of 0.5° C./min to produce a roll-shaped graphite film.

The results are shown in Table 4.

Example 13

As a polymer film 50, a polyimide film manufactured by KANEKA CORPORATION and having a width of 250 mm and a length of 100 m (trade name: APICAL 75AH, thickness: 75 μm, corresponding to a pyrolysis onset temperature of 500° C.) was prepared. As shown in FIG. 5, the polymer film 50 was wound up around a core 100 having a diameter of 80 mm under the conditions of a tension of 80 N/m and a winding rate of 10 m/min while one of the surfaces of the film was diselectrified by a diselectrifying device 40. It is to be noted that the tension was detected using a pick-up roller 300 shown in FIG. 5.

After the winding up, the thus obtained roll-shaped polymer film was placed inside a tube having an inner diameter of 130 mm, and the polymer film was rewound along the inner surface of the tube so that polymer film layers were in close contact with one another. After the whole polymer film was rewound, the core 100 was removed. The thus prepared roll-shaped polymer film had an inner diameter φ of 100 mm and no gap between polymer film layers.

Figure 9:
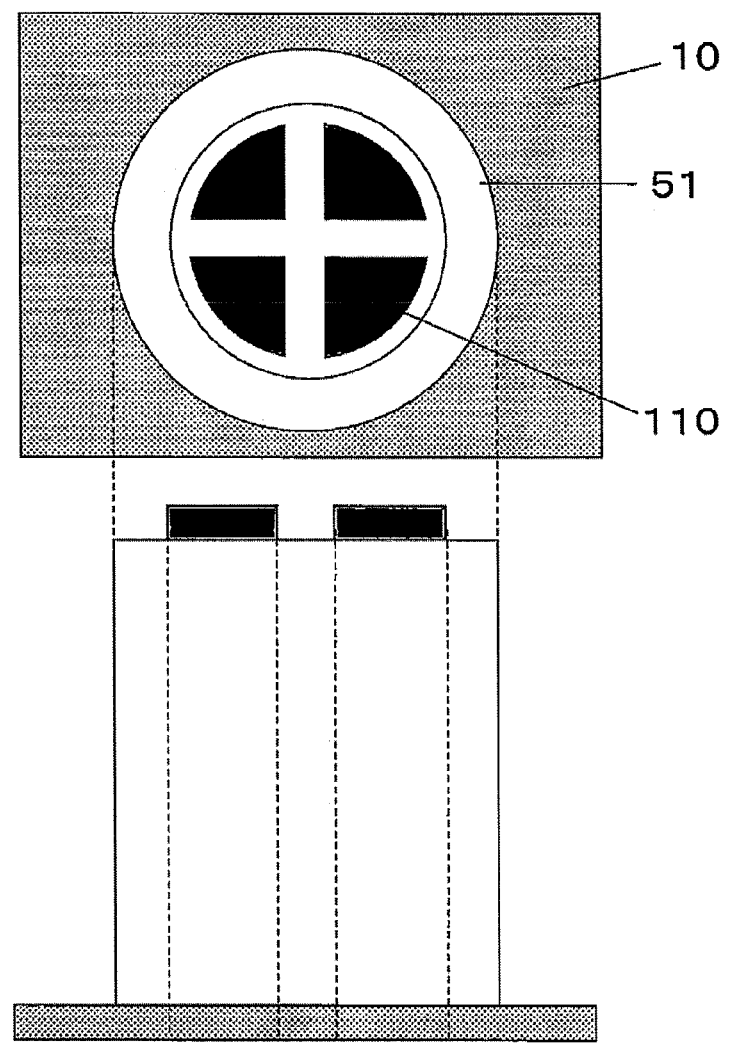
FIG. 9 is a diagram showing a state before reducing a core diameter in Example 13 of the present invention.

Then, as shown in FIG. 6, this roll-shaped polymer film was vertically set in an indirect heating furnace, and a 4-part split core 110 was placed at the center of the roll of the polymer film so that the diameter of the core was 95 mm, which is more specifically shown in FIG. 9. A heater 500 located outside the roll-shaped polymer film was electrically heated to increase the temperature from room temperature to 1000° C. at a temperature rise rate of 1° C./min while a nitrogen gas was introduced at a flow rate of 5 L/min to perform carbonization treatment. In this regard, the nitrogen gas is introduced through an inlet 65, and therefore exhaust gas flows toward a pipe 70. It is to be noted that as shown in FIG. 8, the outer diameter of the core was reduced to 60 mm by uniting the 4 core parts when the temperature reached 550° C.

After the core was removed, the thus produced roll-shaped carbonaceous film was vertically set in the indirect heating furnace and subjected to graphitization treatment by increasing the temperature to 2900° C. at a temperature rise rate of 0.5° C./min to produce a roll-shaped graphite film.

The results are shown in Table 4.

Comparative Example 5

Figure 10:
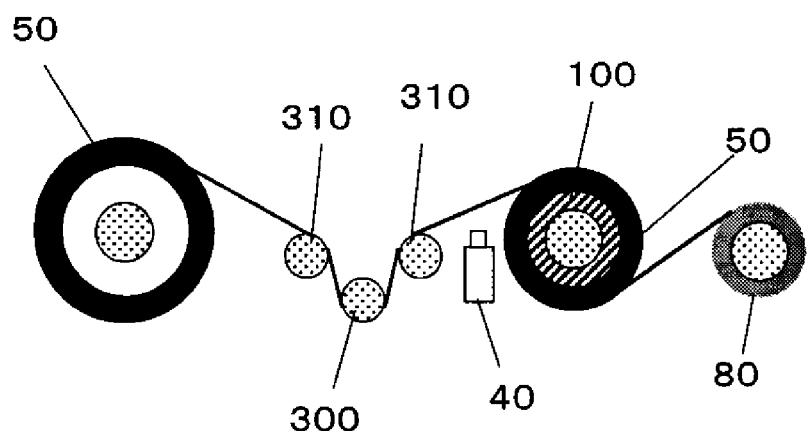
FIG. 10 is a diagram showing how to rewind a polymer film in Example 14 of the present invention.

As shown in FIG. 10, a polyimide film manufactured by KANEKA CORPORATION and having a width of 250 mm and a length of 100 m (trade name: APICAL 75AH, thickness: 75 μm, corresponding to a pyrolysis onset temperature of 500° C.) was prepared as a polymer film 50, and a PET film (thickness: 18 fin) having a width of 25 mm and a length of 100 m was prepared as a slip sheet 80, and the polymer film 50 and the slip sheet were wound up around a core 100 having a diameter of 100 mm. At this time, two rolls of the slip sheet were prepared, and the polymer film and the slip sheets were wound up at the same time so that the slip sheets were located at both ends of the polymer film. As shown in FIG. 10, both the polymer film and the slip sheets were wound up under the conditions of a tension of 20 N/m and a winding rate of 10 m/min while one of the surfaces of the film was diselectrified by a diselectrifying device 40. It is to be noted that the tension was detected using a pick-up roller 300 shown in FIG. 10.

Figure 4:
FIG. 4 is a diagram showing the end surface of a roll of a wavy carbonaceous film.
Figure 4:

After the winding up, the outermost periphery of the roll-shaped polymer film was fixed with an adhesive tape to prevent the roll-shaped polymer film from loosening, and then as shown in FIG. 4, the slip sheets 80 were removed from the outer peripheral side to form gaps between polymer film layers. The core 100 was not removed, and was continuously used also in the next process. The thus prepared roll-shaped polymer film had an inner diameter φ of 100 mm and gaps whose size just after gap formation was 18 μm±2.0 μm.

Then, as shown in FIG. 6, this roll-shaped polymer film was vertically set in an indirect heating furnace. A heater 500 located outside the roll-shaped polymer film was electrically heated to increase the temperature from room temperature to 1000° C. at a temperature rise rate of 1° C./min while a nitrogen gas was introduced at a flow rate of 5 L/min to perform carbonization treatment. In this regard, the nitrogen gas is introduced through an inlet 65, and therefore exhaust gas flows toward a pipe 70.

After the core was removed, the thus produced roll-shaped carbonaceous film was vertically set in the indirect heating furnace and subjected to graphitization treatment by increasing the temperature to 2900° C. at a temperature rise rate of 0.5° C./min to produce a roll-shaped graphite film.

The results are shown in Table 4.

Comparative Example 6

A roll-shaped graphite film was produced in the same manner as in Comparative Example 5 except that a PET film having a thickness of 23 μm was used as the slip sheet 80. As a result, the gaps between polymer film layers had a size of 23 μm±2.0 μm just after gap formation. The results are shown in Table 4.

Example 14

As shown in FIG. 10, a polyimide film manufactured by KANEKA CORPORATION and having a width of 250 mm and a length of 100 m (trade name: APICAL 75AH, thickness: 75 μm, corresponding to a pyrolysis onset temperature of 500° C.) was prepared as a polymer film 50, and a PET film (thickness: 18 μm) having a width of 25 mm and a length of 100 m was prepared as a slip sheet 80, and the polymer film 50 and the slip sheet were wound up around a core 100 having a diameter of 100 mm. At this time, two rolls of the slip sheet were prepared, and the polymer film and the slip sheets were wound up at the same time so that the slip sheets were located at both ends of the polymer film. As shown in FIG. 10, both the polymer film and the slip sheets were wound up under the conditions of a tension of 20 N/m and a winding rate of 10 m/min while one of the surfaces of the film was diselectrified by a diselectrifying device 40. It is to be noted that the tension was detected using a pick-up roller 300 shown in FIG. 10. After the winding-up, the outermost periphery of the thus obtained roll-shaped polymer film was fixed with an adhesive tape to prevent the roll-shaped polymer film from loosening, and then as shown in FIG. 4, the slip sheets 80 were removed from the outer peripheral side to form gaps between polymer film layers. Then, the core 100 was removed. The thus prepared roll-shaped polymer film had an inner diameter φ of 100 mm and gaps whose size just after gap formation was 18 μm±2.0 μm.

Then, as shown in FIG. 6, this roll-shaped polymer film was vertically set in an indirect heating furnace, and a 4-part split core 110 was placed at the center of the roll of polymer film so that the diameter of the core was 100 mm. A heater 500 located outside the roll-shaped polymer film was electrically heated to increase the temperature from room temperature to 1000° C. at a temperature rise rate of 1° C./min while a nitrogen gas was introduced at a flow rate of 5 L/min to perform carbonization treatment. In this regard, the nitrogen gas is introduced through an inlet 65, and therefore exhaust gas flows toward a pipe 70. It is to be noted that as shown in FIG. 8, when the temperature reached 550° C., the outer diameter of the core was reduced to 70 mm by uniting the 4 core parts.

After the core was removed, the thus produced roll-shaped carbonaceous film was vertically set in the indirect heating furnace and subjected to graphitization treatment by increasing the temperature to 2900° C. at a temperature rise rate of 0.5° C./min.

The results are shown in Table 4.

TABLE 4

| | Polymer film | | Initial state | | | | After change in core diameter | | |
|---|---|---|---|---|---|---|---|---|---|
| | Thickness (Tf) μm | Inner diameter of roll nm | Outer diameter of core mm | Gap between polymer film layers (Ts) μm | Ts/Tf | Ratio of space in 50% cross-sectional circle % | Temperature at the time of change in core diameter ° C. | Weight reduction ratio % | Outer diameter of core after change mm |
| Comparative Example 1 | 75 | 100 | 100 | 0 | 0.00 | 0 | — | — | 100 |
| Comparative Example 3 | 75 | 100 | 100 | 0 | 0.00 | 0 | 550 | 1.2 | 95 |
| Comparative Example 4 | 75 | 100 | 95 | 0 | 0.00 | 17 | — | — | 95 |
| Example 13 | 75 | 100 | 95 | 0 | 0.00 | 17 | 550 | 1.2 | 60 |
| Comparative Example 5 | 75 | 100 | 100 | 18 | 0.24 | 19 | — | — | 100 |
| Comparative Example 6 | 75 | 100 | 100 | 23 | 0.31 | 23 | — | — | 100 |
| Example 14 | 75 | 100 | 100 | 18 | 0.24 | 19 | 550 | 1.2 | 70 |

TABLE 4-continued

|  | After change in core diameter | | | Evaluations | | | | | |
|---|---|---|---|---|---|---|---|---|---|
|  | | | | Carbonaceous film | | | Graphite film | | |
|  | | | | Fusion bonding | | | Fusion bonding | | |
|  | Gap between polymer film layers (Ts) μm | Ts/Tf | Ratio of space in 50% cross-sectional circle % | Number of film layers in which fusion bonding was observed | | Rippling | Number of film layers in which fusion bonding was observed | | Rippling |
| Comparative Example 1 | 0 | 0.00 | 0 | 50 | E | A | 50 | E | A |
| Comparative Example 3 | 0 | 0.00 | 17 | 38 | E | A | 38 | E | A |
| Comparative Example 4 | 0 | 0.00 | 17 | 38 | E | A | 38 | E | A |
| Example 13 | 0 | 0.00 | 57 | 0 | A | B | 0 | A | B |
| Comparative Example 5 | 18 | 0.24 | 19 | 35 | E | A | 35 | E | A |
| Comparative Example 6 | 23 | 0.31 | 23 | 32 | E | A | 32 | E | A |
| Example 14 | 18 | 0.24 | 57 | 0 | A | B | 0 | A | B |

In Comparative Example 3, a space was formed inside the 50% cross-sectional circle at 550° C. which was higher than the pyrolysis onset temperature so that the ratio of the space inside the 50% cross-sectional circle was 17%. In this comparative example, fusion bonding was less likely to occur than Comparative Example 1 in which no space was formed, but fusion bonding-improving effect was not sufficient. In Comparative Example 4, a roll-shaped polymer film whose ratio of the space inside the 50% cross-sectional circle was 17% was prepared and heat-treated without changing the ratio of the space inside the 50% cross-sectional circle even at a temperature equal to or higher than the pyrolysis onset temperature, and as a result, fusion boning-improving effect was not sufficient as in the case of Comparative Example 3. On the other hand, in Example 13, a roll-shaped polymer film whose ratio of the space inside the 50% cross-sectional circle was 17% was prepared as in the case of Comparative Example 4, but the ratio of the space inside the 50% cross-sectional circle was increased to 57% by reducing the diameter of the core at 550° C. which was higher than the pyrolysis onset temperature, and as a result, fusion bonding did not occur and fusion bonding-improving effect was sufficiently obtained. The reason for this is considered to be that a decomposition gas causing fusion bonding was produced from the polymer film at a temperature equal to or higher than the pyrolysis onset temperature of the polymer film, but fusion bonding could be effectively improved by increasing the space at a temperature equal to or higher than the pyrolysis onset temperature of the polymer film. However, rippling slightly occurred because the ratio of the space inside the 50% cross-sectional circle was 57% that was slightly high.

In Comparative Example 5, a roll-shaped polymer film having gaps of 18 μm between polymer film layers was prepared so that Ts/Tf was 0.24 and was then heat-treated without changing the ratio even at a temperature equal to or higher than the pyrolysis onset temperature of the polymer film, but fusion bonding-improving effect was low because the gap formation ratio was not sufficient. In Comparative Example 6, a roll-shaped polymer film having gaps of 23 μm between polymer film layers was prepared so that Ts/Tf was 0.31, but as in the case of Comparative Example 5, fusion bonding-improving effect was not sufficient.

On the other hand, in Example 14, a roll-shaped polymer film having gaps of 18 μm between polymer film layers was prepared so that Ts/Tf was 0.24 as in the case of Comparative Example 5, but the diameter of the core was reduced to 70 mm at 550° C. which was higher than the pyrolysis onset temperature so that the ratio of the space inside the 50% cross-sectional circle was 57%. As a result, fusion bonding did not occur, that is, fusion bonding could be improved. However, rippling slightly occurred because the ratio of the space inside the 50% cross-sectional circle was 57% that was slightly high.

REFERENCE SIGNS LIST

1 Center of roll-shaped polymer film
2 Innermost periphery of roll-shaped polymer film
3 Point at which film length from innermost end of roll-shaped polymer film is 50% of total film length
4 Position of outer periphery of core
5 Position of outer periphery of core when core is not continuously formed
10 Stage
40 Diselectrifying device
50 Polyimide film
51 Roll-shaped polymer film
55 Inner case
60 Stage
65 Inlet
70 Exhaust port
80 Slip sheet
100 Core
110 Core used during heat treatment
200, 210 End of carbonaceous film roll
300 Pick-up roller
310 Guide roller
400 Space
500 Heater

The invention claimed is:
1. A method for producing a carbonaceous film, comprising the steps of:
  (1) winding a polymer film into a roll shape to obtain a roll-shaped polymer film at a temperature lower than a pyrolysis onset temperature of the polymer film, so that
    (1-1) a value determined for the whole roll-shaped polymer film by dividing a thickness of a gap between adjacent layers of the polymer film (Ts) by a thickness of the polymer film (Tf) (Ts/Tf) satisfies a relationship of Ts/Tf<0.33 or Ts/Tf>1.50 in a cross-section of the roll-shaped polymer film and (1-2) so that i) the cross-section of the roll-shaped polymer film has an inner portion defined by a first 50% of a total length of the polymer film and an outer portion defined by a second 50% of the total length of the polymer film, ii) the inner portion of the cross-section of the roll-shaped polymer film has a cross-section of the polymer film and optionally a cross-section of a space, and iii) a total cross-sectional area of the space counts for 0% or more and less than 25% of a total area of the inner portion of the cross-section of the roll-shaped polymer film;

(2) adjusting a shape of the roll-shaped polymer film at a temperature equal to or higher than a pyrolysis onset temperature of the polymer film but equal to or lower than a temperature at which a weight of the polymer film is reduced by 40% as compared to that before start of heat treatment, so that the roll-shaped polymer film has (2-1) a gap between layers of the polymer film so that a value determined for the whole roll-shaped polymer film by dividing a thickness of the gap between adjacent layers of the polymer film (Ts) by a thickness of the polymer film (Tf) (Ts/Tf) satisfies a relationship of 0.33≤Ts/Tf≤1.50 in the cross-section of the roll-shaped polymer film and/or (2-2) so that i) the cross-section of the roll-shaped polymer film has an inner portion defined b a first 50% of a total length of the polymer film and an outer portion defined by a second 50% of the total length of the polymer film, ii) the inner portion of the cross-section of the roll-shaped polymer film has a cross-section of the polymer film and a cross-section of a space, and iii) a total cross-sectional area of the space counts for 25% or more of a total area of the inner portion of the cross-section of the roll-shaped polymer film; and then (3) heat-treating the roll-shaped polymer film so as to produce a carbonaceous film, wherein the polymer film is a polyimide film.

2. The method for producing a carbonaceous film according to claim 1, wherein the roll-shaped polymer film has a core, and an outer diameter of the core is reduced at a temperature equal to or higher than the pyrolysis onset temperature but equal to or lower than a temperature at which a weight of the polymer film is reduced by 40% as compared to that before start of heat treatment.

3. A method for producing a graphite film, comprising heat-treating the carbonaceous film produced by the production method according to claim 1 or 2 to a temperature of 2400° C. or higher to produce a graphite film.

4. The method for producing a carbonaceous film according to claim 1, wherein the step of adjusting the shape of the roll-shaped polymer film is conducted by at least one process selected from the processes consisting of:

i) after winding the polymer film around a core into the roll shape in the step of winding, reducing an outer diameter of the core so that the space is formed between the core and an innermost layer of the roll-shaped polymer film;

ii) placing the roll-shaped polymer film in a tube having an inner diameter larger than an outer diameter of the roll-shaped polymer film, fixing an outer peripheral end of the roll-shaped polymer film to an inner wall of the tube, and rotating the tube in a direction opposite to the winding direction of the roll-shaped polymer film so that the space is formed between a core and the roll-shaped polymer film or between film layers; and iii) rewinding the roll-shaped polymer film so that the space is formed between a core and the roll-shaped polymer film or between film layers.

* * * * *